United States Patent [19]

Kizler et al.

[11] Patent Number: 5,193,413
[45] Date of Patent: Mar. 16, 1993

[54] CONNECTING ROD FOR PISTON ENGINES

[75] Inventors: Wolfgang Kizler, Fellbach; Michael Krämer, Notzingen, both of Fed. Rep. of Germany

[73] Assignee: Mercedes-Benz AG, Fed. Rep. of Germany

[21] Appl. No.: 877,726

[22] Filed: May 4, 1992

[30] Foreign Application Priority Data

May 3, 1991 [DE] Fed. Rep. of Germany ....... 4114488

[51] Int. Cl.[5] .............................................. G05G 1/00
[52] U.S. Cl. ................................. 74/579 E; 123/197.3
[58] Field of Search .......................... 74/579 E, 579 R; 29/888.09; 123/197.3

[56] References Cited

U.S. PATENT DOCUMENTS

| | | | |
|---|---|---|---|
| 3,994,054 | 11/1976 | Cuddon-Fletcher | 74/579 E X |
| 4,836,044 | 6/1989 | Lobig | 74/579 E |
| 5,036,727 | 8/1991 | Engel | 74/579 E |
| 5,109,605 | 5/1992 | Hoag et al. | 74/579 E X |

FOREIGN PATENT DOCUMENTS

| | | | |
|---|---|---|---|
| 808008 | 7/1951 | Fed. Rep. of Germany | 74/579 E |
| 1001544 | 1/1957 | Fed. Rep. of Germany | 74/579 E |
| 364217 | 10/1938 | Italy | 74/579 E |
| 56-114638 | 9/1981 | Japan | 29/888.09 |
| 59-205238 | 11/1984 | Japan | 29/888.09 |

OTHER PUBLICATIONS

MTZ Jahrg 14, Nr. 1, Jan. 1953, S. 9.
Zeitschrift "Ingenieur-Werkstoffe", Apr. 1990, S. 53.

*Primary Examiner*—Rodney H. Bonck
*Assistant Examiner*—Andrea Pitts
*Attorney, Agent, or Firm*—Evenson, Wands, Edwards, Lenahan & McKeown

[57] ABSTRACT

The invention relates to connecting rods for piston engines, made of sintered metal, the connecting-rod shank consisting of two individual booms separated from one another. The object is to connect the individual booms to the connecting-rod eyes in such a way that the danger of buckling is effectively minimized. The object is achieved in that the arrangement of the connection of the individual booms to the connecting-rod eyes takes place at such an angle and these connections are made so smoothly by means of transitional radii that the force flux between the connecting-rod eyes and the individual booms has an optimum course.

7 Claims, 1 Drawing Sheet

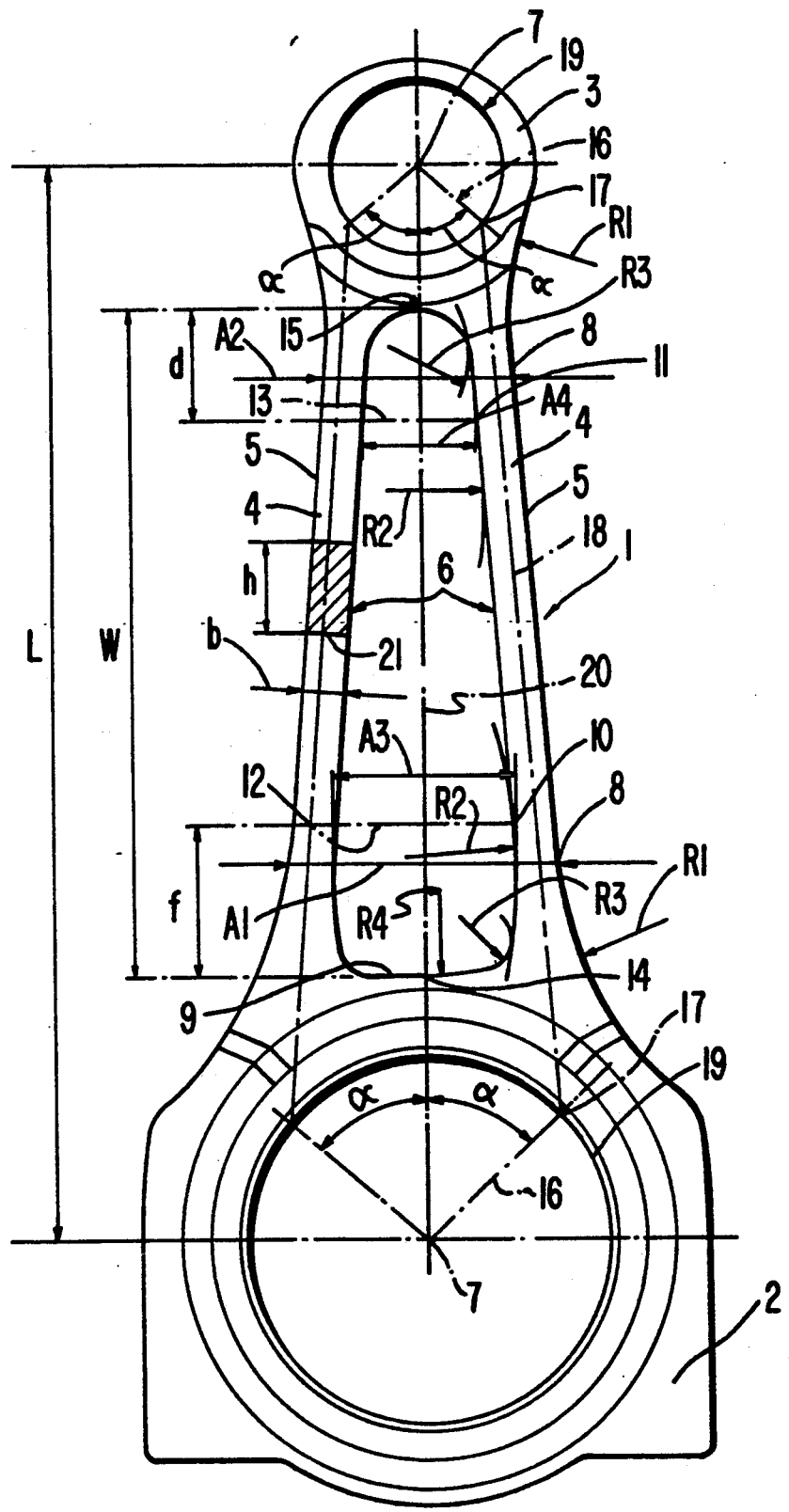

CONNECTING ROD FOR PISTON ENGINES

BACKGROUND AND SUMMARY OF THE INVENTION

The invention relates to a connecting rod for piston engines.

A connecting rod of the relevant generic type is known from the periodical Ingenieur-Werkstoffe"[Engineering Materials"], April 1990, page 53. The highly loaded connecting-rod shank consists of two separate individual booms which are of essentially rectangular profile and are arranged with the longitudinal sides of the rectangular profile in the direction of the longitudinal axis of the connecting-rod eye and which extend at an acute angle to one another, the connections of the individual booms to the connecting-rod eyes being designed with transitional radii in order to prevent notching points.

However, the separation of the double-T profile into two separate rectangular profiles leads to an appreciably greater danger that the individual booms will buckle in the direction of rotation of the crankshaft. This is especially so since, by virtue of construction, the rectangular profiles of the individual booms are arranged in a way opposing relatively little resistance to their buckling in the direction of rotation of the crankshaft. Therefore, because of the buckling safety which is required, substantially larger cross-sections of the connecting-rod shank than are actually necessary in view of the fatigue strength of the sintered metal are employed.

An object of the invention is to design 2 connecting rod of the generic type in such a way that the relatively small cross-section of the connecting-rod shank, made possible by the high fatigue strength of the sintered metal, does not have to be enlarged as a result of the requisite buckling safety.

According to the current invention, this object is achieved by a connecting rod arrangement for piston engines, made of sintered metal and having two individual booms which are separated from one another to form an interspace extending between the connecting-rod eyes over essentially the entire length of the connecting-rod shank. The individual booms are connected respectively to a large and a small connecting-rod eye. The individual booms, which extend with their longitudinal mid-axes so as to approach one another at an acute angle in the direction of the small connecting-rod eye, having an essentially rectangular cross-section, and the wide sides of the rectangular cross-section extending in the direction of the longitudinal axes of the connecting-rod eyes. The outer wide sides of the individual booms adjoin the outer contours of the connecting-rod eyes by means of radii (R1) and the inner wide sides of the individual booms likewise being connected to the connecting-rod eyes by means of radii. At the height of the radius onsets from the straight region of the outer wide sides of the individual booms to the radius (R1), the distances between the outer wide sides of the individual booms are smaller than the outside diameters of the respective connecting-rod eye, and between imaginary straight lines, which connect the intersection points between the longitudinal mid-axes of the booms and the bore walls of the connecting-rod eyes to the longitudinal axes of the connecting-rod eyes, and to a longitudinal mix-axis of the connecting rod, respective angles α of 45° to 50° are formed, wherein the connection of the inner longitudinal sides of the individual booms to the connecting rod eyes is made in the form of double radii. The substantially larger radii adjoining the individual booms amounts to approximately 0.5 times to one times the length of the connecting rod and is continue into smaller radii (R3) for joining to the connecting-rod eyes. Further, the larger radii (R2) adjoin the inner wide sides of the individual booms by means of respective radius onsets, and between a respective straight line intersecting the two mutually opposite radius onsets and a vertex point of the respective connecting-rod side located between the individual booms and intersected by the longitudinal mid-axis of the connecting rod, there is a distance which corresponds approximately to the distance between the inner longitudinal sides at the height of the respective radius onsets.

The advantageous effects of the design of a connecting rod according to the invention are to be found in the optimization of the force flux between the connecting-rod eyes and the individual booms of the connecting rod shank. The minimization of the bending stresses which is achieved thereby leads to sufficient safety against buckling, without the cross-section and consequently the mass of the connecting-rod shank being increased.

Other objects, advantages and novel features of the present invention will become apparent from the following detailed description of the invention when considered in conjunction with the accompanying drawings.

BRIEF DESCRIPTION OF THE DRAWINGS

The single drawing figure is a side, part sectional view of a connecting rod constructed according to a preferred embodiment of the invention.

DETAILED DESCRIPTION OF THE DRAWINGS

The connecting rod 1 is formed of sintered metal and includes a large connecting-rod eye 2 and a small connecting-rod eye 3 which are connected to one another by means of two individual booms 4 separated from one another and extending so as to approach one another at an acute angle in the direction of the small connecting-rod eye.

The individual booms 4 are formed with a rectangular cross-section. The longitudinal sides 5 and 6 of the booms 4 extend in the direction of the longitudinal axes 7 of the connecting-rod eyes. In the straight portion of each individual boom 4, the sides 5, 6 of each boom 4 narrow in their distance from one another at an angle of a maximum of 0.5°, the narrowing pointing in the direction of the small connecting-rod eye 3.

According to the invention, the arrangement of the connections of the individual booms 4 to the connecting-rod eyes 2, 3 is designed in such a way that between imaginary straight lines 16, which connect the intersection points 17 of the longitudinal mid-axes 18 of the booms at the bore walls 19 of the connecting-rod eyes 2, 3 to the longitudinal axes 7 of the connecting-rod eyes, and the longitudinal mid-axis 20 of the connecting rod 1 respective angles α of 45° to 50°, preferably 47.5°, are formed.

This connection according to the invention of the individual booms 4 to the connecting-rod eyes 2, 3 is so designed that the transition from the outer longitudinal sides 5 of the individual booms 4 to the outer contours of the connecting-rod eyes 2, 3 takes place by means of radii R1 of at least 0.3 times the length L of the connecting rod 1. At the height of the radius onsets 8 from the straight individual booms 4 to the radii RI the distances Al and A2 between the outer longitudinal sides 5 of the individual booms 4 becomes smaller than the outside diameter of the respective connecting-rod eyes 2, 3.

At the same time, the length L of the connecting rod 1 corresponds to the distance between the connecting-rod eye longitudinal axes 7 of the connecting-rod eyes 2, 3.

On the inner longitudinal sides 6 of the individual booms 4, the connection to the connecting-rod eyes 2, 3 is made via double radii, the radii R2 which adjoin the straight portions of the individual booms 4 corresponding approximately to 0.5 to one times the length L of the connecting rod 1. The radii R2 are adjoined by smaller radii R3 which make the connection to the connecting-rod eyes 2, 3. At the same time, the radii R3 correspond approximately to the width b of the narrow sides 21 of the rectangular profile of the individual booms 4.

Furthermore, the portion 9 of the outer contour of the large connecting-rod eye 2, which is present between the radii R3, extends at a radius R4 of approximately 0.5 to one times the length L of the connecting rod 1, the curvature being in the same direction as the curvatures of the radii R3.

The radii R2 adjoin the inner longitudinal sides 6 of the individual booms 4 on the same side as both the large and the small connecting-rod eye 2, 3 by means of radius onsets 10, 11. Between a straight line 12, 13 respectively intersecting two mutually opposite radius onsets 10, 11 and the vertex points 14, 15 located between the individual booms 4 and intersected by the longitudinal mid-axis 20 of the connecting rod 1 there are distances f, d which correspond approximately to the distances A3, A4 between the inner wide sides 6 at the height of the radius onsets 10, 11. A further feature is that the mutually opposite radius onsets 8, 10; 8, 11 of the outer and inner longitudinal sides 5, 6 of an individual boom 4 are arranged at different heights.

Advantageously, the rectangular profile of the individual booms 4 is of such dimensions that, in connecting rods I, of which the axial guidance in the direction of the longitudinal axes 7 of the connecting-rod eyes is taken over by the small connecting-rod eye 3, the ratio of the width h of the longitudinal sides 5, 6 of the individual booms 4 to the width b of the narrow sides 21 of the individual booms 4 in the straight region between the radius onsets 10, 11 corresponds approximately to 1.65 times the ratio of the length L of the connecting rod 1 to the distance w between the vertex points 14, 15.

In contrast to this, in connecting rods 1, of which the axial guidance in the direction of the longitudinal axes 7 of the connecting-rod eyes is taken over by the large connecting-rod eye 2, the rectangular profile of the individual booms 4 is of dimensions such that the ratio of the width h of the longitudinal sides 5, 6 of the individual booms 4 to the width b of the narrow sides 21 of the individual booms 4 in the straight region between the radius onsets 10, 11 corresponds approximately to 1.43 times the ratio of the length L of the connecting rod 1 to the distance w between the vertex points 14, 15.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Connecting rod for piston engines, made of sintered metal and having two individual booms which are separated from one another to form an interspace extending between connecting-rod eyes essentially over an entire length of a connecting-rod shank and which are connected respectively to a large and a small connecting-rod eye, the individual booms, which extend with their longitudinal mid-axes so as to approach one another at an acute angle in a direction of the small connecting-rod eye, outer wide sides of the individual booms adjoining outer contours of the connecting-rod eyes by means of radii and inner wide sides of the individual booms likewise being connected to the connecting-rod eyes by means of radii, at a height of a radius onsets form a straight region of the outer wide sides of the individual booms to a radius distance between the outer wide sides of the individual booms being smaller than outside diameters of the respective connecting-rod eye, and between imaginary straight lines, which connect intersection points between longitudinal mid-axes of the booms and bore walls of the connecting-rod eyes to the longitudinal mid-axis of the connecting rod, respective angles $\alpha$ of 45° to 50° being formed, wherein connection of inner longitudinal sides of the individual booms to the connecting-rod eyes is made in a form of double radii, substantially larger radii which adjoin the individual booms amounting to approximately 0.5 times to one times a length of the connecting rod and being continued into smaller radii for joining to the connecting-rod eyes, and wherein the larger radii adjoin the inner wide sides of the individual booms by means of respective radius onsets, and between a respective straight line intersecting two mutually opposite radius onsets and a vertex points of a respective connecting-rod side located between the individual booms and intersected by the longitudinal mid-axis of the connecting rod there is a distance between the inner longitudinal sides at the height of the respective radius onsets.

2. Connecting rod for piston engines according to claim 1, wherein the radii amount to at least 0.3 times the length of the connecting rod.

3. Connecting rod for piston engines according to claim 1, wherein the mutually opposite radius onsets of the outer and inner longitudinal sides of an individual boom are arranged at respectively different heights.

4. Connecting rod for piston engines according to claim 1, wherein the radii correspond approximately to a width of the narrow sides of the individual booms.

5. Connecting rod for piston engines according to claim 1, wherein a portion of the outer contour of the large connecting-rod eye which extends between the radii has a radius of approximately 0.66 times the length of the connecting rod, curvature of the radius being in the same direction as the curvature of the radii.

6. Connecting rod for piston engines according to claim 1, wherein, in connecting rods, of which axial guidance in a direction of the longitudinal axes of the connecting-rod eyes is taken over by the small connecting-rod eyes, a ratio of the width of the longitudinal sides of the individual booms in the straight region between the radius onsets to the width of the narrow sides of the individual booms in a region between transitional radii corresponds approximately to 1.65 times a ratio of the length of the connecting rod to the distance between vertex points.

7. Connecting rod for piston engines according to claim 1, wherein, in connecting rods, of which the axial guidance i a direction of the longitudinal axes of the connecting-rod eyes is taken over by the large connecting-rod eye, a ratio of the width of the longitudinal sides of the individual booms in the straight region between the radius onsets to the width of the narrow sides of the individual booms in a region between transitional radii corresponds approximately to 1.43 tinmes a ratio of the length of the connecting rod to the distance between vertex points.

* * * * *